United States Patent [19]
Okuno

[11] 3,911,457
[45] Oct. 7, 1975

[54] VIEWFINDER FOR SINGLE LENS REFLEX CAMERAS INCLUDING MEANS TO VIEW EXPOSURE GUIDES

[75] Inventor: Youichi Okuno, Yokohama, Japan
[73] Assignee: Canon Kabushiki Kaisha, Japan
[22] Filed: Jan. 31, 1973
[21] Appl. No.: 328,294

[30] Foreign Application Priority Data
Feb. 7, 1972 Japan.............................. 47-13429
May 11, 1972 Japan............................ 47-054696

[52] U.S. Cl. .................. 354/225; 354/54; 354/57; 354/155
[51] Int. Cl.² ................. G03B 13/08; G03B 17/20
[58] Field of Search ....... 95/11 V, 42, 44 R; 88/1.5; 350/286, 173; 354/54, 57, 155, 225

[56] References Cited
UNITED STATES PATENTS

| | | | |
|---|---|---|---|
| 3,094,911 | 6/1963 | Reiche et al. | 95/42 X |
| 3,250,196 | 5/1966 | Ort et al. | 95/44 R |
| 3,282,178 | 11/1966 | Nelson | 95/42 X |
| 3,524,380 | 8/1970 | Yamada | 88/1.5 R |
| 3,534,671 | 10/1970 | Yamaguchi | 95/42 |
| 3,601,477 | 8/1971 | Miyazaki | 95/42 X |
| 3,687,038 | 8/1972 | Kawakami | 354/155 |
| 3,710,699 | 1/1973 | Mitani | 350/173 UX |

FOREIGN PATENTS OR APPLICATIONS
43,799 3/1966 Germany ................ 95/11 V

Primary Examiner—Samuel S. Matthews
Assistant Examiner—Kenneth C. Hutchison
Attorney, Agent, or Firm—McGlew and Tuttle

[57] ABSTRACT

The viewfinder comprises a pentagonal roof prism and a pair of wedge prisms interposed between the roof prism and an eye-piece. The wedge prisms are so arranged that their sloping surfaces face each other with an air gap therebetween, and the light flux travelling directly from the bottom face of the pentagonal roof prism to the slanting surfaces is deflected by full reflection. At least one reflecting surface is provided on one of the wedge prisms, and the light rays from an information source are guided into the wedge prism and to the eye piece after reflection on the reflecting surface, with diaphragm information being indicated in the viewfinder. The light flux from the information source or sources travels either through the pentagonal roof prism or directly from the information source to the wedge prisms.

5 Claims, 9 Drawing Figures

VIEWFINDER FOR SINGLE LENS REFLEX CAMERAS INCLUDING MEANS TO VIEW EXPOSURE GUIDES

This invention relates to a viewfinder for single lens reflex cameras using pentagonal roof prism assembly and, in particular, to an improvement in the indicating means by means of which the images of exposure guides such as distance scales, stop value marks, shutter speeds, depths of focus, or similar exposure factors, engraved on the camera lens barrel, are caused to appear at suitable places in the periphery of the field of view of the viewfinder, the improvement of the invention being effected by utilization of a ghost image blocking assembly.

Conventionally, in single lens reflex cameras, there is known a type of viewfinder provided with a prism 2 cemented to a portion of the upper surface of the front face of a pentagonal roof prism 3, as shown in FIGS. 1 and 2, as a means for indicating exposure guides engraved on the lens barrel in the field of view of the viewfinder, wherein an information 1 on the lens barrel is reflected from a side or sides of the prism 2 and transmitted through the pentagonal roof prism 3, reaching an eye-piece 6. However, this conventional means has disadvantages in that, in the case of the prism shown in FIG. 1, the information image appearing in the field of view of the viewfinder is inverted because of only one reflection in prism 2, while the prism 2 shown in FIG. 2 protrudes forwardly so much that its appearance strikes persons as strange although an erected information image is effected by two reflections in the prism 2.

Another type of viewfinder provided with a small-sized prism therein mounted on one of the roof surfaces in which the prism projects the light rays reflected from an information source into the pentaprism, and still another type of viewfinder in which the information light travels around the pentaprism into a prism positioned in front of the eye-piece and from there to the eye of an operator, are already known. However, some of viewfinders the former type, adapted to be used interchangeably with cameras and including information sources in the housing of the pentaprism result, unavoidably in a considerable increase in size when an optical assembly for the projection of the information light is incorporated in the available space of the housing. The camera being carried with the purpose of snap photography and the like, it is desirable that the viewfinder does not extend too much from the camera body and is compact. The viewfinders of the latter type, in which the prism positioned in front of the eye-piece, reflects the information image to the eye-piece have the disadvantage that the edges of the prism obstruct the view when looking through the viewfinder and the prism requires a relatively large space in the housing. Viewfinders when, provided with upwardly opening windows therein for the purpose of receiving light, present no problem for the taking of pictures under day light, but in such places as in theaters, where only objects to be photographed and their environments are bright but the environment of the operator of the camera is so dark that the information image is difficult to see, have problems, such as the necessity of an auxiliary illuminating device, The ghost image blocking means will now be explained. Referring to FIG. 3, there are illustrated an objective lens 4, a mirror 8, a focus plate F, a condenser lens 10, a pentagonal roof prism 11, an eye-piece 12, a wedge 13 having a vertex angle of and a prism 14 for compensating change in the optical path caused by the provision of wedge 13. Suppose that an incident light strikes the bottom face of the pentaprism at P it will be reflected from the roof surfaces and front face of the pentaprism and then may be fully reflected from the bottom face of the pentaprism, impinging on wedge 13, in which it is reflected from the sloping surfaces A of wedge 13, thus being not permitted to travel through eye-piece 12 to the eye of an operator. If the wedge 13 is not present, the incident light P reaches the eye after the total internal reflection in the pentaprism, becoming a bundle of light rays undesirable for observing the field of view.

SUMMARY OF THE INVENTION

This invention utilizes skillfully the above-mentioned ghost cut means, so that the images of exposure guides, such as distance scales, stop value marks, shutter speeds, focal depths in the object space, flash guides, etc., which travel from the upper part of the pentaprism to the eye-piece can be seen easily on upper and lower outer portions of the field of view of the viewfinder whereby the images appear erected, and moreover the forward projection of the front wall of the housing from the pentaprism can be shortened thereby so that the appearance of the camera will give a good impression.

For an understanding of the principles of the invention, reference is made to the following description of typical embodiments thereof as illustrated in the accompanying drawings.

DESCRIPTION OF THE PREFERRED EMBODIMENTS

Figure 1:
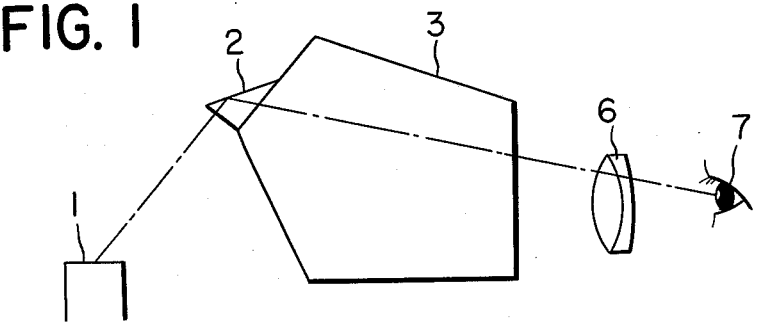
FIGS. 1 and 2 are schematic sectional views illustrating conventional prior art viewfinders including means to view exposure guides.
Figure 2:
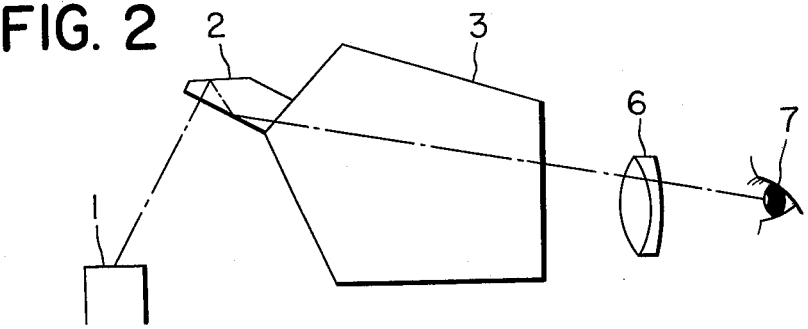
Figure 3:
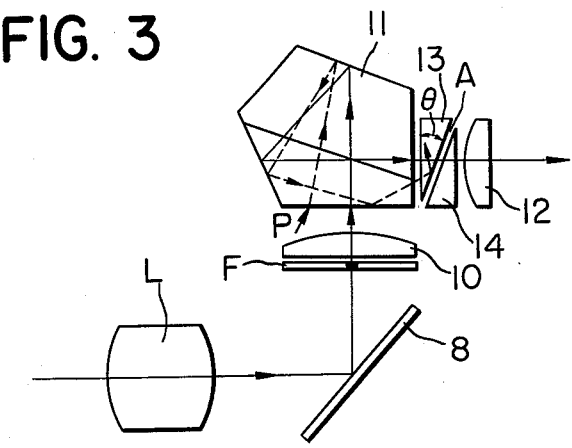
FIG. 3 is a schematic sectional view illustrating a prior art ghost cut assembly incorporated in a viewfinder optical system for single lens reflex cameras.
Figure 4:
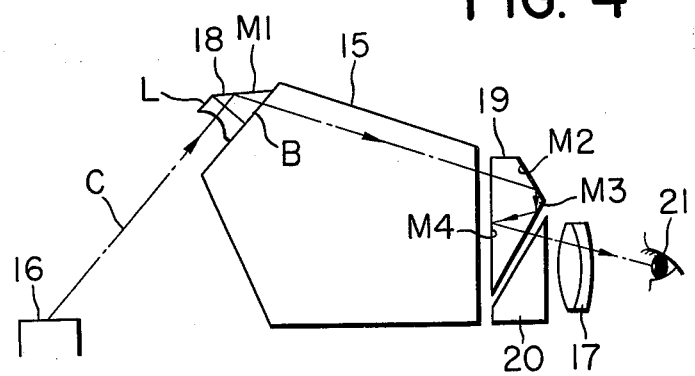
FIG. 4 is a view, similar to FIG. 3, illustrating a viewfinder including indicating means and forming a first embodiment of the invention.

A first embodiment of this invention is illustrated in FIG. 4, and is constructed in such a manner that a prism 18, having a mirror or reflecting surface M1, adapted to reflect the information light C emanating from the lens barrel 16 toward the eyepiece 17, is positioned over a certain portion B of the upper surface of the front face of the pentaprism, which portion B is not used as a reflecting surface and is made lightpermeable. Also interposed between pentagonal roof prism 15 and eyepiece 17 is a prism assembly consisting of two wedges or wedge-shaped prisms 19 and 20 spaced apart from each other to form an air gap between mutually parallel surfaces of the two prisms. In the same manner as described for the "ghost" assembly of FIG. 3, undesired light rays entering the bottom surface of prism 15 and internally reflected therein toward the prisms 19 and 20 and the eyepiece 17, are totally reflected by the mirror surface M3 of wedge or prism 19 and thus prevented from entering the lower portion of the field of view of the viewfinder. This light is the light indicated by the broken line of FIG. 3 as entering prism 11 at the point P, and exactly the same effect takes place in FIG. 4.

In the case of the embodiment shown in FIG. 4, the information image appears on an upper outer portion of the field of view of the viewfinder because the information light C emanating from the lens barrel is reflected for the first time from the reflecting surface $M_1$ of prism 18 and is transmitted through the pentagonal prism 15, reaching the prism 19 in which it is reflected from sides $M_2$, $M_3$ and $M_4$ for the second, third and fourth times, respectively, and finally to the eye-piece 17. Therefore, the information image 16 can be seen as an erect image on the upper outer portions of the field of view of the viewfinder by the operator's eye 21 when looking into the viewfinder through the eye-piece 17.

Figure 5:
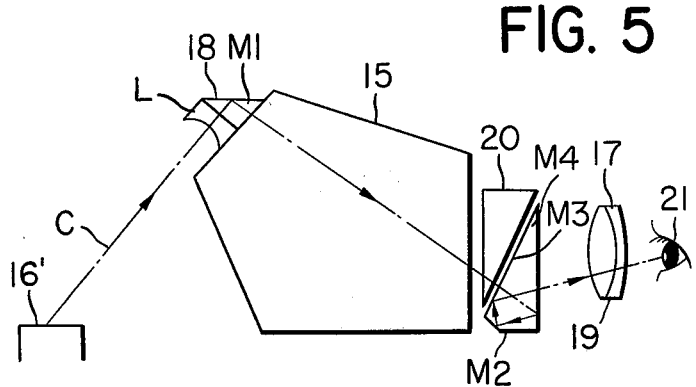
FIG. 5 is a view, similar to FIG. 4, illustrating a second embodiment of the invention in which the ghost cut prism assembly shown in FIG. 4 is inverted.
Figure 6:
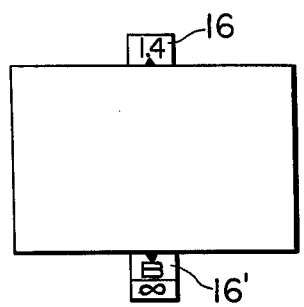
FIG. 6 is an elevation view of the visual field and the exposure guides as observed in the embodiments of the invention shown in FIGS. 4 and 5.

FIG. 5 shows a second embodiment wherein the prisms 19, 20 shown in FIG. 4 are interchanged in position and their pointing directions are inverted so that the information image 16' appears erected on a lower portion of the field of view of the viewfinder. The number of reflections of the information image is equal to that of FIG. 4. FIG. 6 is a visual field observed in case both constructions, shown in FIGS. 4 and 5, are combined, in which the information images 16, 16' are allowed to appear on the upper and lower portions, respectively of the field of view of the viewfinder.

As has been mentioned above, the viewfinder of this invention is provided with a prism, mirror having a surface therein, mounted on a part of the upper surface of the pentagonal prism, and two ghost prisms image blocking are interposed between the pentagonal roof prism and the eye-piece, so that the information images may appear erect on suitable portions in the periphery of the field of view of the viewfinder, whereby the position of the mirror has no direct relation to how close to the periphery of the field of view of the viewfinder the position at which the information image appears can be brought, so that the mirror may be mounted near the top of the front face of the pentagonal roof prism with only a small forward projection of the mirror from the pentagonal roof prism. Moreover, the internal reflection from the bottom face of the pentagonal roof prism is image blocking off by the ghost cut prism assembly to allow a clear image to appear in the field of view of the viewfinder.

Further, visibility compensation can be made by deforming one of the reflecting surfaces into a concave surface to form a divergent reflection system, or by interposing a divergent lens L (shown in FIGS. 4, 5) in the light path.

Figure 7:
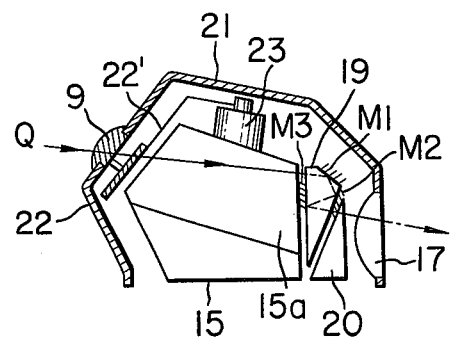
FIG. 7 is a sectional view illustrating a third embodiment of the invention.
Figure 8:
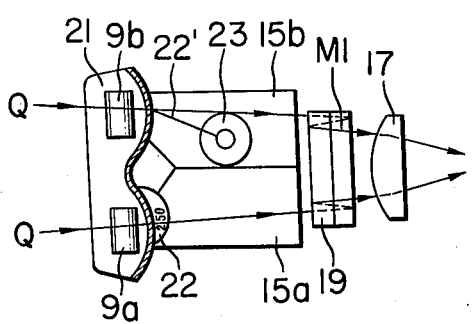
FIG. 8 is a top plan view, partly in section, of the embodiment of the invention shown in FIG. 7.
Figure 9:
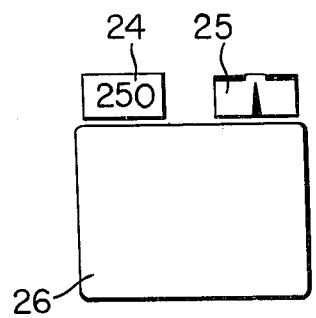
FIG. 9 is an elevation view of the visual field and exposure guides as observed in the embodiment of the invention shown in FIGS. 7 and 8.

A third embodiment, illustrated in FIGS. 7, 8 and 9, is so constructed that, in a viewfinder free from the ghost image, certain portions of the sides of the wedges, provided for the purpose of cutting off the ghost image are modified so as to become mirrors, and light-receiving windows 9a, 9b are formed in the front wall the housing, through which the light of rays from the object may pass to illuminate information sources 22, 22'. The information images travel along the roof surfaces 15a, 15b of the pentaprism and through the wedge prism 19, and they are admitted in to enter to the neighborhood of the light flux for the field of view of the viewfinder. Therefore, even if the environment of the operator is dark, the exposure guide will not be difficult to see. Further, the wedge 19 for projecting the information image into the field of view of the viewfinder extend a little higher than the roof surfaces at the edges adjacent the wedges, so that the available space formed thereby between the top face of the housing and the roof surfaces 15a, 15b may be used for installation of an exposure meter body 23, for example. The viewfinder of this invention can be made compact overall in such manner to overcome some conventional defects.

FIG. 8 shows a top view of the viewfinder shown in FIG. 7, wherein the members corresponding to those shown in FIG. 7 are denoted by the same numerals and symbols. Light rays Q which pass through the windows 9a, 9b to illuminate information sources 22, 22' travel along the roof surfaces 15a, 15b over of the pentagonal roof prism, and enter the wedge prism 19 in which they are reflected from reflecting surfaces $M_1$, $M_2$ and $M_3$ successively, and transmitted through the compensation prism 20 and eye-piece 17, reaching the eye of an operator.

FIG. 9 shows how the information images 24, 25 appear, wherein the numeral 26 denotes the field of view of the viewfinder on the upper outer portions of which there appear an information image 24 coming from the information sources 22, for example, a shutter value, and an information image 25 coming from information source 22', for example, the pointer of an exposure meter. In this embodiment, the information light is not projected into the pentaprism as mentioned above, so that there is no need to provide any special optical assembly for the projection on the pentaprism. The space formed between the top wall of the housing and the roof surface of the pentaprism is available not only for mounting information sources, but also for passing the information image through the residual space along the roof surface. Thus, the view finder of this invention includes no complicated optical assembly such as usually seen in the conventional viewfinder of the type including information sources therein. Therefore, the viewfinders of the types described can not be more easily manufactured, but also can be made more compact so as not to be burdensome when being carried. Moreover, the means of this invention is very effective for providing a clear field of view free from ghost images.

While specific embodiments of the invention have been shown and described in detail to illustrate the application of the principles of the invention, it should be understood that the invention may be embodied otherwise without departing from such principles.

What is claimed is;

1. In a viewfinder for single lens reflex cameras of the type including a focussing screen, an objective lens forming an image of an object on the focussing screen, a pentagonal roof prism having a bottom light entry surface, a roof surface, at least one front reflecting surface and a rear light exit surface, an eyepiece facing the rear light exit surface, an optical element interposed between the rear light exit surface of the pentagonal prism and the eyepiece and having a reflection-transmission surface for directing, toward the eyepiece, light entering the bottom surface of the pentagonal prism from the focussing screen and reflected by the roof surface and the front reflecting surface for projecting through the light exit surface toward the eyepiece, the optical element having a reflecting surface operable to totally reflect, in a direction away from the eyepiece, undesired light entering the bottom surface of the pentagonal prism and internally reflected in the pentagonal prism by the roof surface, the front surface and the bottom surface toward the light exit surface: the improvement comprising, in combination, at least one indication member; and means, including said optical element, forming at least one reflection surface additionally reflecting light from said indication member to said eyepiece.

2. A viewfinder for single reflex cameras, as claimed in claim 1, in which said optical element includes a prism having a first surface opposing and parallel to said light exit surface of said pentagonal prism, and having second and third surfaces extending at an angle to said first surface; said second surface of said optical element constituting a reflection-transmission surface reflecting information light from said indication member toward said eyepiece.

3. A viewfinder for a single lens reflex camera, as claimed in claim 2, in which said optical element further includes a second prism for correcting the optical path; said second prism having a surface opposing and parallel to said second surface of said first-mentioned prism, and having a further surface parallel to said first surface of said firstmentioned prism.

4. A viewfinder for single lens reflex cameras, as claimed in claim 3, including a housing for said viewfinder; said indicating member being mounted within said housing on said viewfinder.

5. A viewfinder for single lens reflex cameras, as claimed in claim 1, in which said indication member is a part of a lens barrel forming a component of said reflex camera; said means forming said at least one reflection surface reflecting information light from said indication member including a further prism mounted on a part of said front surface of said pentagonal roof prism not utilized as a reflecting surface and constituted by a transparent surface, for guiding the light rays from said indication member through said pentagonal roof prism.

* * * * *